Feb. 11, 1969     C. W. BIMBA     3,426,657
PISTON CONNECTION TO ROD IN DOUBLE END ROD TYPE CYLINDER
Filed June 14, 1967

INVENTOR:
Charles W. Bimba

BY:

Philip J. Liggett

ATTORNEY

United States Patent Office 3,426,657
Patented Feb. 11, 1969

3,426,657
PISTON CONNECTION TO ROD IN DOUBLE
END ROD TYPE CYLINDER
Charles W. Bimba, Crete, Ill.
(101 Main St., Monee, Ill. 60449)
Filed June 14, 1967, Ser. No. 646,053
U.S. Cl. 92—255                          3 Claims
Int. Cl. F16j 1/12; F16b 9/02; B25g 3/20

ABSTRACT OF THE DISCLOSURE

A double split ring and locking bushing connection of a straight through rod to the piston of an air cylinder or other type of fluid motor. Two sets of split retaining rings are used in spaced apart grooves of the rod and a threaded lock-bushing slipped around the rod effects a tight holding of the rod against the retaining rings and against an internally threaded seat portion of the piston.

Specification

The present invention relates to an improved means for connecting a double-ended piston rod to the piston of an air cylinder or other similar form of fluid motor. More particularly, the invention is directed to an improved and simplified connection which utilizes two spaced apart grooves in the piston rod for holding split retainer rings and a threaded lock-nut slipping over the rod and into the piston member to in turn serve to hold the piston in a tight manner to the rod.

There have been various methods utilized in previously known constructions for connecting a double end rod to the internal piston of an air cylinder; however, these prior construction systems have been expensive and such that it is difficult to attain good alignment for the rod to preclude binding and excessive wear. To assure the best alignment of the elongated piston rod, it has been the practice to use a one-piece rod that extends entirely through the piston and through both ends of the cylinder housing. Then, in order to attach the piston to the straight through rod, the piston has been made of brass so that it may be silver soldered to the rod. Brass is of course expensive while, in addition, the heating and soldering step generally causes distortion of the rod. This results in the need of still further heating and straightening operations before effecting a final assembly of the air cylinder unit.

Another prior construction and assembly method for double end rod cylinders has utilized a single groove in the rod for an accompanying single split retainer ring and a threaded lock-nut adapted to tighten the piston member against the ring and thus to the piston rod. However, the single ring connection means relies upon a tight fit of the split ring into the groove to obtain a non-moving rigid attachment between piston and piston rod. Close tolerance machining of grooves and retainer rings again results in an expensive construction system, but any looseness in the assembly means a rapidly deteriorating unit.

Summary of the invention

In contrast to the expensive and troublesome prior assembly means, it may be considered a principal object of the present invention to provide a piston to piston rod connection system which results in a tight attachment between them and eliminates the need to hold any close tolerances between groove widths and retainer rings.

It may also be considered an object of the present invention to eliminate the need for special metals such as brass pistons and silver soldering, as well as eliminate the need to effect subsequent heating and rod straightening procedures.

In one embodiment, the present invention for effecting the connection of a piston with the piston rod in a double end type fluid motor unit, which comprises, providing a split ring in each of two spaced apart grooves in a continuous straight through piston rod, said grooves positioned thereon to be within the piston of said unit, said piston being provided with an internal shoulder section adapted to encompass said rod and bear against one of said split rings on said rod, said piston also provided with a threaded portion adapted to engage a threaded locking bushing, said bushing having a central opening providing a slide fit over said piston rod and, in addition, having an internal end sized to bear against the other of the split rings on said rod, whereby the tightening of said bushing to said piston in turn effect a tight pressure against the latter split ring and locking of the rod to the piston with a resulting tight pressure against the internal shoulder section of the piston from the split ring adjacent such shoulder section.

A particular advantage of the improved piston connection means is the ability to have easy and rapid replacement of new piston rods with a piston in the air cylinder. In the use of air cylinders or other fluid motor units, the piston rod wear and breakage provides for the principal problem in the utilization of the motor units. Thus, where there can be the reuse of the cylinder housing and the piston with a new or replacement piston rod there is a resulting longer life to the major portion of the unit and a substantial overall economy in the usage of such cylinders. In order to have a replacement of the piston rod and a reconnection with the internal piston member, it is of course necessary that the cylinder housing have at least one removable end portion such that there can be the disassembly and reconnection of the piston and the piston rod member. Various types of removable ends or air cylinder houses have been developed and it is not intended to limit the present invention to any one type of cylinder housing, removable end portion, or other means of disassembly.

Reference to the accompanying drawing and the following description thereof will serve to better illustrate one embodiment of the present improved invention and the advantages obtained in the use thereof for providing an economical means of piston and piston rod assembly without distortion or damage to a straight through type of double end piston rod means.

Figure 1:
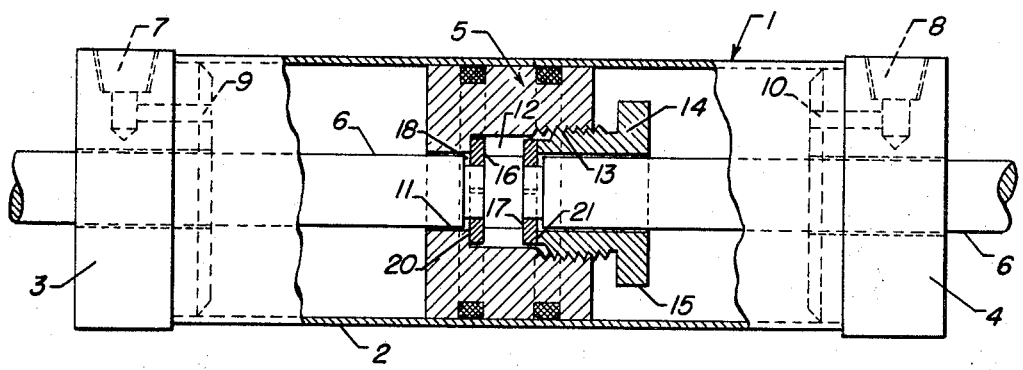
FIGURE 1 of the drawing shows diagrammatically and partially in section, an assembly view providing for the connection of the internal piston with a double end rod for a fluid motor unit.

Referring now particularly to FIGURE 1 of the drawing there is shown an air cylinder housing 1 with a cylindrical body section 2 and end closure members 3 and 4. Although not shown in the present drawing, the latter shall be attached to the body section by threading, bolting means, or other suitable clamping means, such that there is a resulting air tight internal cylinder cavity or zone for the reciprocating movement for the piston member 5. Each of the end closure members 3 and 4 shall also be provided with axially positioned bored openings to accommodate the movement of the double-ended piston rod 6. At each end of the unit, there are additionally formed, the fluid port means, such as 7 and 8 respectively, which will permit the introduction and exhaust of air or other suitable operating fluid medium to the interior of the motor unit by way of passageway means 9 and 10.

In accordance with the preferred embodiment of the present invention, the double-ended piston rod member 6 will be of a one piece design in order to assure good alignment through the entire fluid motor unit and shall extend from both ends thereof in order that work load connections may be made at each end of the double end rod cylinder unit. However, for simplification of the present drawing, the external connections to the double-ended piston rod are not shown. The one piece design for the piston rod not only permits good alignment through the entire motor unit but also provides for the easy replacement of the rod where there is excessive wear or breakage for any particular cylinder unit. Of course, as noted hereinbefore, there is the resulting salvaging of the remaining portion of the motor unit by being able to merely replace the rod.

In effecting the assembly, the piston member 5 is necessarily provided with an axial bore hole on one face thereof that is sized to be a slip fit over the piston rod member 6. Interiorly of the axial opening 11 there will be an enlarged recessed section 12 and an opposing threaded portion 13. For interior threading, the latter will be sized to match and engage external threading on a locking nut or bushing 14. Bushing 14 in turn has an axial bored opening which is sized to be a slip fit over piston rod 6. An enlarged flanged portion 15 is shown on an external end portion of bushing 14 to serve as a gripping section in effecting the tightening of the bushing into the internally tapped portion 13 of piston 5. The enlarged portion 15 of the locking bushing may be knurled or preferably provided with flat surfaced portions in the manner of a large nut so that it will in turn accommodate a wrench or other suitable tool for effecting the tightening of the bushing to the piston member 5.

Figure 2:
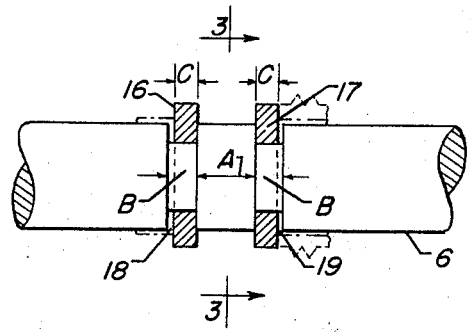
FIGURE 2 of the drawing shows, in a partially enlarged view, of the means for providing split retainer rings within spaced apart grooves on the piston rod and, in addition, the lack of the need for a close fit or tolerance between the ring and groove portions.

As more clearly shown in the enlargement, as FIGURE 2 of the drawing, the piston rod 6 is provided with two spaced apart split retainer rings 16 and 17 which in turn are adapted to be placed within spaced apart grooves 18 and 19, respectively.

The width or spacing between grooves A need not be of any critical dimension; however, a spacing should be such that it falls within the recessed portion 12 as provided interiorly of piston member 5. In addition, the external diameters for the split ring members 16 and 17 shall be fabricated so as to be slightly less than the internal diameter of said recessed area 12 whereby they may readily slip into the latter upon the insertion of the piston rod 6 into and through piston member 5.

In effecting the actual tightening of the rod 6 to the piston 5, it will be seen in FIGURE 1 of the drawing that an external face of split ring member 16 will bear against an internal face or shoulder section 20 as provided by the recessed section 12 of piston 5. At the same time, as the threaded bushing or nut 14 is tightened within piston 5 there will be a bushing end portion 21 to bear against the other split ring member 17 and a resulting tight clamping and locking of piston rod 6 with piston 5.

Referring again to FIGURE 2 of the drawing, it will seem that the respective grooves 18 and 19 may have widths B which are greater than widths C for each of the ring members 16 and 17. In other words, the present construction makes it unnecessary to have any particular tolerances or substantially identical widths between B and C. It is, however, deemed preferable that the grooves 18 and 19 be of a square cut, perpendicular design or cross-section configuration and that the accompanying retainer rings 16 and 17 be of a square shoulder construction such that they will fit tightly against the sides of the grooves and provide good bearing surfaces for the tight clamping desired between the piston rod 6 and the piston 5 through the tightening of locking member 14.

Figure 3:
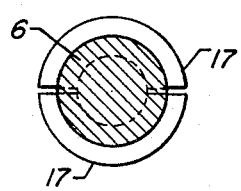
FIGURE 3 of the drawing merely indicates a cross-sectional view through the piston rod member and an elevational view of a split ring member within a groove of the piston rod, as shown by the line 3—3 in FIGURE 2 of the drawing.

In FIGURE 3 of the drawing, there is indicated that each of the split ring members, such as 17, may comprise two one-half ring portions such that each portion of the two retainer rings may be dropped into their particular grooves on rod 6 as the latter is being inserted into the piston 5 just prior to engaging and tightening the locking bushing 14 to piston 5. Preferably, as hereinbefore noted, the outside diameter of each of the ring members 16 and 17 will be just slightly less than the internal diameter of the recessed section 12 such that the latter will preclude the lifting out or falling out of the half portions of split ring members within the internal portion of piston 5.

Inasmuch as the present drawing is diagrammatic, it is to be realized that various modifications may be made within the scope of this invention, particularly with respect to configurations of the threaded locking nut or bushing, the retainer rings, the piston member and the piston rod, as well as to the cylinder housing. For example, the piston member may have an external hub or boss-like portion which will serve more outwardly the threaded portion and provide a greater recessed area within the piston. Also, where desired, there may be external threading on such hub portion of the piston and, therefore, internal threading provided for a portion of the locking bushing to fit over and accommodate itself to the threading of the piston. In any case, it is required that there be means for effecting axial movement and a tightening adjustment between a locking bushing, such as 14, and a portion of the piston such that there will be bearing between the piston and one split ring member and an opposing bearing between an end portion of the locking bushing and the other of the split retainer rings, whereby there is the resulting rigid locking of the piston rod with the piston.

With respect to the split rings themselves, it is possible to use a "one-piece" ring for both the rings 16 and 17. Each ring will have a fairly large slot or opening which is of sufficient size to snap over the piston rod within a groove zone 18 or 19 and not fall off the rod. Thus, as used in this application, the terms "split-ring" or "split retainer ring" shall refer to two half rings or a one piece ring which has a slot sized to snap fit over the grooved portion of the piston rod.

I claim as my invention:

1. In a fluid motor unit of the double end rod type having the piston rod extend axially two ways from a motor housing and from a movable piston member in a cylinder portion of the unit, an improved rod and piston connection means, which comprises, providing a split ring in each of two spaced apart grooves in a continuous straight through piston rod, said grooves positioned thereon to be within the piston of said unit, said piston being provided with an internal recessed section and an internal offset shoulder section adapted to encompass said rod and bear against one of said split rings thereon, said piston also provided with a threaded portion adapted to engage a threaded locking bushing, a threaded locking bushing having a central opening providing a slide fit over said piston rod and, in addition, having an internal end sized to bear against the other of the split rings on said rod, whereby the tightening of said bushing to said piston in turn effects a resulting tight locking of the rod to the piston with pressure of the latter against one split ring and pressure of the end of the locking bushing against the other split ring.

2. The fluid motor piston rod and piston connection means of claim 1 further characterized in that said spaced apart grooves in said rod have transverse perpendicular bearing surfaces and the accompanying split rings for fitting in said grooves have transverse straight bearing surfaces to engage the sides of said grooves and provide resulting tight bearing surfaces therebetween.

3. The fluid motor piston rod and piston connection means of claim 1 further characterized in that said piston member is provided with internal threading sized to engage external threading on a body portion of said locking bushing whereby the latter tightens into said piston member in bearing and locking against said spaced apart split rings.

References Cited

UNITED STATES PATENTS 2,726,887 12/1955 Pierotti _____ 287—20
2,768,037 10/1956 Payne _____ 287—20 X

FOREIGN PATENTS 1,059,198 11/1953 France.
560,738 7/1958 Canada.

CARROLL B. DORITY, JR., *Primary Examiner.*

U.S. Cl. X.R.

287—20.